Nov. 18, 1941.   E. COX ET AL   2,263,487
LEAVENING AGENT
Filed March 18, 1939
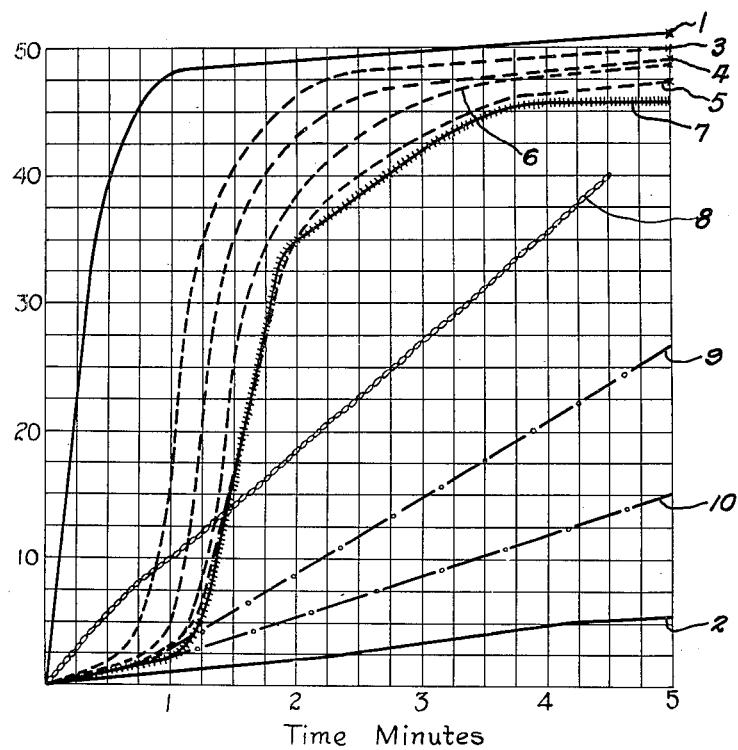
Inventors
Edwin Cox
Robert H. Kean Patented Nov. 18, 1941

2,263,487

UNITED STATES PATENT OFFICE 2,263,487

LEAVENING AGENT

Edwin Cox and Robert H. Kean, Richmond, Va., assignors to Virginia-Carolina Chemical Corporation, Richmond, Va., a corporation of Virginia Application March 18, 1939, Serial No. 262,735

5 Claims. (Cl. 99—95)

This invention pertains to improvements in leavening agents, and particularly to improvements in leavening agents comprising calcium phosphate.

For leavening quick breads by chemical means, gas is released by reaction between an acid ingredient and an alkaline ingredient. Sodium bicarbonate usually is the alkaline component. The acid components proposed have been various, but in commercial practice monocalcium phosphate, herein designated as MCP, is widely in use.

In chemical leavening, the rate of reaction between the acid ingredient and the alkaline source of carbon dioxide determines the lightness of the product to be baked. Ingredients that react rapidly at room temperatures release carbon dioxide gas immediately upon being moistened; but in consequence, substantial amounts of leavening gas may be lost before doughs can be shaped or batters can be poured. A slowly acting ingredient delays gas release until after the cellular structure of breads or cakes has set; consequently, it may disrupt these cellular structures and impair the texture of the finished product. There is no fixed optimum rate of reaction because conditions of use vary considerably between different types of products and between places of use and between different individuals. For example, biscuits may need to be leavened slowly over a long period in hotel bakery practice.

Monocalcium phosphate is an acid leavening ingredient with characteristically rapid rate of evolution of carbon dioxide gas from bicarbonate.

An object of this invention is to modify monocalcium phosphate leavening agents to delay release of gas after liquid has been added to a chemically leavened flour. A broad object is to improve phosphate leavening agents to regulate the release of leavening gas, and to extend the period of evolution of gas. A further object is to extend the rising period over several minutes, and to regulate the rate of leavening during that period. It is sought to control leavening compositions, particularly of calcium phosphate, to obtain various rates of leavening. A further object is to prepare phosphate leavens suitable for batters as well as for biscuit and cake doughs, particularly to delay the rate of gas evolution sufficiently for doughs to be shaped or batters to be poured, and then to evolve gas to a maximum before the dough or batter is set by heat. A further object is to prepare a leavening agent that shall be of higher content of calcium and phosphorus than heretofore and exhibit regulable initial rising power with adequate reserve for oven rise. These and other objects will be more apparent in the following illustrative description of this invention taken with the accompanying drawing and more fully pointed out in the appended claims.

In the drawing:

Figure 1 presents a chart illustrating different rates of gas evolution from bicarbonate controlled by various calcium phosphate compositions, according to the principles of this invention.

Broadly, this invention develops various of its objects by intermixing with a carbonate suitable acidic calcium phosphate adjusted in composition to evolve carbon dioxide more slowly than does MCP. This invention utilizes calcium acid pyrophosphate, herein termed CAPP. This invention comprises, further, intermixing MCP particles modified by less soluble calcium phosphate; specifically MCP coated with CAPP.

Calcium acid pyrophosphate is prepared by heating MCP to a preferred temperature of 200 to 250° C. The formula of the resulting CAPP is $CaH_2P_2O_7$. It is obtained free from phosphoric acid, and below 250° C. free from meta- and orthophosphates. The resulting pyrophosphate is finely divided; and considerably less translucent than crystals of MCP. The source material may be anhydrous MCP, or may be hydrated MCP, in pure crystalline form or in the commercial form which contains admixtures of di- and tricalcium orthophosphate. Preferably, these are heated to about 220 to 240° C. for a period of five to fifteen minutes to convert a desired portion of the MCP particles to a coating of CAPP. Such particles are termed herein, "retarded MCP." This contains higher proportions of calcium and phosphorus than does MCP. Increase of CAPP rapidly lowers the rate of release of $CO_2$ up to about 10% CAPP, or until the particles of MCP are effectively covered; increase of CAPP then serves not so much to lower the rate of $CO_2$ release but to prolong the low rate.

In certain modifications, the MCP may be used as leavening agent in porous condition, produced by heating to evolve water from hydrated crystalline MCP. Further, this porous anhydrous MCP may be caused to contain in its extensive surfaces various amounts of CAPP according to the temperature and duration of heating. The CAPP is adherent to the MCP surfaces.

Acid phosphate leavening agents are affected in their rate of release of carbon dioxide by their physical nature even for the same chemical compound. For example, the rate of leavening with MCP varies as follows:

|  | 1 min. | 2 min. |
|---|---|---|
| Agglomerated MCP hydrate | 48 | 49 |
| Crystal MCP hydrate | 42 | 44 |
| Dehydrated MCP (porous) | 54 | 54 |
| Anhydrous crystal MCP | 43 | 43 |

A mixture of sodium bicarbonate and CAPP in solution evolves substantially no $CO_2$ during a period of one minute under ordinary room conditions. This compares with evolution of substantially 48% of the available $CO_2$ with commercial MCP, or of 50% of the available $CO_2$ where anhydrous MCP reacted. Furthermore, during a period of two minutes CAPP evolved only 2% of the available $CO_2$, while commercial MCP evolved 49% and anhydrous MCP evolved 57%. After thirty minutes commercial MCP had evolved 60% and anhydrous MCP 64%, while CAPP had evolved only 40%. However, after boiling, both commercial MCP and CAPP had evolved 95% of the available $CO_2$; which is to say that at baking temperatures, the final amount of $CO_2$ usable to lighten the dough was substantially the same. In contrast, sodium acid pyrophosphate, released 35% to 45% of the available $CO_2$ during the first minute.

This retardation of leavening action occurs despite the fact that solutions of CAPP in 0.5% concentration exhibit a relatively high hydrogen ion concentration, of about pH 3.18 to 3.20 in comparison with 0.5% MCP solutions of pH 3.9 to 4.3. It is altogether probable, though without commitment necessarily to any theory, that factors both of rate of solution and rate of ionization are lower in rate for CAPP than for MCP, possibly involving sodium-calcium pyrophosphate complexes.

As illustrated in Figure 1, selected mixtures of CAPP with bicarbonate, or with carbonates in general, afford practically limitless variety in retarding the rate and regulating duration of effective leavening of dough. For example, a relatively large proportion of CAPP with a small amount of MCP produces quick initial rise followed by continued steady rise. Or, delayed rising, without any substantial initial rising, is attained by either CAPP alone or by withholding MCP from the sphere of reaction until a later period by coating MCP with less soluble phosphate. That latter is termed "retarded MCP." The following table is illustrative:

| | Composition of material, retarded | | | Percentage of available gas evolved | | |
|---|---|---|---|---|---|---|
| | MCP | MCP | CAPP | 1 min. | 2 min. | 60 min. |
| | 100% | | | 48 | 49 | 65 |
| | | 100% | | 6 | 44 | 40 |
| | | | 100% | | 2 | 40 |
| Mix. #1 | 10 | 80 | 10 | 1 | 35 | 61 |
| Mix. #2 | 40 | 30 | 30 | 10 | 24 | 67 |

Figure 1 with time as abscissae and gas evolution as ordinates further illustrates the variety of control of rates of leavening attainable by the present invention. The curves bear numbers to indicate the compositions of the following table:

1. Monocalcium phosphate hydrate agglomerate.
2. Calcium acid pyrophosphate.
3. Monocalcium phosphate crystals with 1% converted CAPP.
4. Monocalcium phosphate crystals with 6% converted CAPP.
5. Monocalcium phosphate crystals with 15% converted CAPP.
6. Monocalcium phosphate crystals with 14% converted CAPP.
7. 10% of monocalcium phosphate hydrate agglomerate, 10% CAPP, 80% of monocalcium phosphate crystals with 15% converted CAPP.
8. 40% of monocalcium phosphate hydrate agglomerate, 30% of CAPP, 30% of monocalcium phosphate crystals with 15% converted CAPP.
9. 10% of monocalcium phosphate hydrate agglomerate, 60% of CAPP, 30% of monocalcium phosphate crystals with 14% converted CAPP.
10. 20% of monocalcium phosphate hydrate agglomerate, 40% of CAPP, 40% of monocalcium phosphate crystals with 14% converted CAPP.

From available data, it is apparent that the surface of the reactant mass is a factor determining the time and rate of leavening. This corresponds not only to the nature of the CAPP coating, but also to the nature of the underlying MCP. Particularly is this noticeable where hydrated MCP is coated with CAPP by a process of heating which drives off water of composition and leaves MCP in porous condition.

In this description, and in the claims, sodium bicarbonate is used as illustrative alkaline leavening agent, but it is understood that other bicarbonates and carbonates also react with calcium phosphates as herein described. In the claims such sources of carbon dioxide broadly are to be regarded as useful for various purposes and broadly as equivalents to sodium bicarbonate.

According to the patent statutes, the principles and preferred operation of this invention have been described in what is now considered to represent its best embodiment, but it is understood that within the scope of the appended claims modifications will now occur to those skilled in the art and may be practiced otherwise than as specifically illustrated and described.

What we claim is:

1. An improved leavening agent comprising sodium bicarbonate in admixture with particles of monocalcium phosphate which are coated with more than 10% calcium acid pyrophosphate.

2. An improved leavening agent comprising sodium bicarbonate in admixture with monocalcium phosphate, separate particles of monocalcium phosphate coated with more than 10% calcium acid pyrophosphate, and separate particles of calcium acid pyrophosphate.

3. An improved leavening agent comprising sodium bicarbonate in admixture with crystals of anhydrous monocalcium phosphate coated with more than 10% calcium acid pyrophosphate.

4. An improved leavening agent comprising sodium bicarbonate in admixture with particles of anhydrous monocalcium phosphate in porous condition coated with more than 10% calcium acid pyrophosphate.

5. An improved leavening agent comprising sodium bicarbonate in admixture with monocalcium phosphate, calcium acid pyrophosphate and monocalcium phosphate particles coated with about 15% of calcium acid pyrophosphate, these acidic ingredients being in the proportions of 40% monocalcium phosphate, 30% calcium acid pyrophosphate, and 30% of monocalcium phosphate crystals coated with about 15% calcium acid pyrophosphate.

EDWIN COX.
ROBERT H. KEAN.